(12) United States Patent
Holtan et al.

(10) Patent No.: US 7,571,914 B2
(45) Date of Patent: Aug. 11, 2009

(54) PUSH-PULL CART COLLECTION DEVICE AND CONVERSION ASSEMBLY

(75) Inventors: Paul D. Holtan, Savage, MN (US);
Daniel T. Johnson, Medina, MN (US);
James W. Wiff, Cologne, MN (US)

(73) Assignee: Dane Industries, Inc., Brooklyn Park, MN (US)

( * ) Notice: Subject to any disclaimer, the term of this patent is extended or adjusted under 35 U.S.C. 154(b) by 455 days.

(21) Appl. No.: 11/356,923

(22) Filed: Feb. 17, 2006

(65) Prior Publication Data

US 2006/0197295 A1    Sep. 7, 2006

Related U.S. Application Data

(63) Continuation-in-part of application No. 10/965,281, filed on Oct. 14, 2004, now abandoned.

(60) Provisional application No. 60/511,786, filed on Oct. 15, 2003, provisional application No. 60/653,819, filed on Feb. 17, 2005.

(51) Int. Cl.
*B62D 39/00* (2006.01)
*B62D 49/06* (2006.01)
*B62D 51/04* (2006.01)

(52) U.S. Cl. ............................ 280/33.991; 280/33.992; 280/DIG. 4; 180/11; 180/14.1; 180/19.1; 180/908

(58) Field of Classification Search ............ 280/33.991, 280/33.992, DIG. 4; 180/11, 14.1, 19.1, 180/908; *B62D 39/00, 49/06, 51/04*
See application file for complete search history.

(56) References Cited

U.S. PATENT DOCUMENTS

| 1,050,919 | A | 1/1913 | Conley |
| 2,381,190 | A | 8/1945 | Tiner et al. |
| 2,497,234 | A | 2/1950 | Salvatore |
| 2,518,816 | A | 8/1950 | Powers |

(Continued)

FOREIGN PATENT DOCUMENTS

AT    340315    12/1977

(Continued)

OTHER PUBLICATIONS

Dane Industries, Brochure "Productivity Solutions from the Industry Leader", 2 pages, 2001.

(Continued)

*Primary Examiner*—Christopher P Ellis
*Assistant Examiner*—Jacob Meyer
(74) *Attorney, Agent, or Firm*—Dorsey & Whitney LLP

(57) ABSTRACT

The present invention is a shopping cart collection device adapted to engage to first and second shopping carts and capable of pulling a first train of shopping carts extending from the first shopping cart and pushing a second train of shopping carts extending from the second shopping cart. The device comprises a motorized unit comprising a drive wheel, a first hitch and a second hitch. The first hitch is proximate a first side of the motorized unit and is adapted to engage the first shopping cart. The second hitch is proximate a second side of the motorized unit opposite the first side and is adapted to engage the second shopping cart.

20 Claims, 11 Drawing Sheets

U.S. PATENT DOCUMENTS

| | | | |
|---|---|---|---|
| 2,621,687 A | | 12/1952 | William |
| 2,695,179 A | | 11/1954 | Fancsali |
| 2,720,992 A | | 10/1955 | Cushman |
| 2,790,513 A | | 4/1957 | Draxler |
| 2,846,018 A | | 8/1958 | Puckett |
| 2,877,911 A | | 3/1959 | Arnot |
| 2,904,202 A | | 9/1959 | Brady |
| 2,935,161 A | | 5/1960 | Comfort |
| 3,127,209 A | | 3/1964 | Faust et al. |
| 3,524,512 A | | 8/1970 | Voeks et al. |
| 3,575,250 A | | 4/1971 | Dykes et al |
| 3,633,086 A | | 1/1972 | Speth et al. |
| 3,791,474 A | | 2/1974 | Stammen et al. |
| 3,876,024 A | | 4/1975 | Shieman et al. |
| 3,887,095 A | | 6/1975 | Suzuki |
| 4,053,025 A | | 10/1977 | Slusarenko |
| 4,096,920 A | | 6/1978 | Heyn |
| 4,265,337 A | | 5/1981 | Dammeyer |
| 4,266,903 A | | 5/1981 | Surbrook |
| 4,531,757 A | | 7/1985 | Kuhn |
| 4,573,549 A | | 3/1986 | Pankow |
| 4,611,948 A | | 9/1986 | Johnson |
| 4,634,337 A | | 1/1987 | Hamman |
| 4,730,685 A | | 3/1988 | Sinkkonen |
| 4,771,840 A | * | 9/1988 | Keller .......................... 180/11 |
| 4,793,763 A | | 12/1988 | Bubik |
| 4,878,050 A | | 10/1989 | Kelley |
| 4,942,529 A | | 7/1990 | Avitan et al. |
| 4,964,837 A | | 10/1990 | Collier |
| 5,011,169 A | | 4/1991 | Henderson et al. |
| 5,048,626 A | | 9/1991 | Stehler et al. |
| 5,064,012 A | | 11/1991 | Losego |
| 5,082,074 A | | 1/1992 | Fischer |
| 5,096,358 A | | 3/1992 | Plant et al. |
| 5,161,634 A | | 11/1992 | Ichihara et al. |
| 5,167,389 A | | 12/1992 | Reimers |
| 5,322,306 A | * | 6/1994 | Coleman ............... 280/33.992 |
| 5,340,202 A | | 8/1994 | Day |
| 5,388,176 A | | 2/1995 | Dykstra et al. |
| 5,439,069 A | * | 8/1995 | Beeler .......................... 180/11 |
| 5,483,615 A | | 1/1996 | Hallidy |
| 5,511,926 A | | 4/1996 | Iles |
| 5,518,260 A | | 5/1996 | Grignon |
| 5,573,078 A | | 11/1996 | Stringer et al. |
| 5,580,207 A | | 12/1996 | Kiebooms et al. |
| 5,592,355 A | | 1/1997 | Ikkai et al. |
| 5,633,544 A | | 5/1997 | Toida et al. |
| 5,743,347 A | | 4/1998 | Gingerich |
| 5,762,155 A | | 6/1998 | Scheulderman |
| 5,769,051 A | | 6/1998 | Bayron et al. |
| 5,783,989 A | | 7/1998 | Issa et al. |
| 5,791,669 A | | 8/1998 | Broddon et al. |
| 5,808,376 A | | 9/1998 | Gordon et al. |
| 5,860,485 A | * | 1/1999 | Ebbenga ................ 180/19.2 |
| 5,880,652 A | | 3/1999 | Snel |
| 5,934,694 A | | 8/1999 | Schugt et al. |
| 5,947,490 A | | 9/1999 | Munnoch et al. |
| 5,964,313 A | | 10/1999 | Guy |
| 5,983,614 A | | 11/1999 | Hancock et al. |
| 5,984,333 A | | 11/1999 | Constantijn et al. |
| 6,022,031 A | * | 2/2000 | Reiland et al. ......... 280/33.993 |
| 6,060,859 A | | 5/2000 | Jonokuchi et al. |
| 6,070,679 A | * | 6/2000 | Berg et al. ................ 180/19.2 |
| 6,109,379 A | | 8/2000 | Madwed |
| 6,144,125 A | | 11/2000 | Birkestrand et al. |
| 6,168,367 B1 | | 1/2001 | Robinson |
| 6,220,379 B1 | * | 4/2001 | Schugt et al. ............. 180/65.1 |
| 6,244,366 B1 | | 6/2001 | Otterson et al. |
| 6,260,643 B1 | * | 7/2001 | Schuchardt ............... 180/14.1 |
| 6,352,130 B2 | | 3/2002 | Klein et al. |
| 6,378,642 B1 | | 4/2002 | Sutton |
| 6,406,250 B2 | | 6/2002 | Jaeger et al. |
| 6,435,803 B1 | * | 8/2002 | Robinson .................... 414/539 |
| 6,481,514 B2 | | 11/2002 | Takada |
| D475,645 S | | 6/2003 | Hoonsbeen |
| 6,681,877 B2 | | 1/2004 | Ono et al. |
| 6,685,211 B2 | | 2/2004 | Iles |
| 6,729,421 B1 | | 5/2004 | Gluck et al. |
| 6,820,887 B1 | | 11/2004 | Riggle |
| 6,871,714 B2 | | 3/2005 | Johnson |
| 6,880,652 B2 | | 4/2005 | Holtan et al. |
| 7,134,515 B2 | | 11/2006 | Lenkman |
| 7,389,836 B2 | | 6/2008 | Johnson et al. |
| 2003/0231945 A1 | | 12/2003 | Weatherly |
| 2004/0134692 A1 | | 7/2004 | Kime et al. |
| 2004/0245030 A1 | * | 12/2004 | Holtan et al. ............... 180/19.1 |
| 2004/0256166 A1 | | 12/2004 | Holtan et al. |
| 2005/0098362 A1 | | 5/2005 | Johnson |
| 2005/0098364 A1 | | 5/2005 | Johnson et al. |
| 2005/0116431 A1 | * | 6/2005 | Holtan et al. .......... 280/33.992 |
| 2006/0102392 A1 | | 5/2006 | Johnson et al. |
| 2006/0243500 A1 | | 11/2006 | Wiff et al. |
| 2006/0244226 A1 | * | 11/2006 | Ondrasik ............... 280/33.992 |
| 2006/0273547 A1 | | 12/2006 | Holtan et al. |
| 2007/0013157 A1 | | 1/2007 | Wiff et al. |
| 2007/0145707 A1 | | 6/2007 | Johnson |
| 2007/0181352 A1 | | 8/2007 | Holtan et al. |
| 2007/0289787 A1 | | 12/2007 | Wiff et al. |
| 2008/0257618 A1 | | 10/2008 | Johnson et al. |

FOREIGN PATENT DOCUMENTS

| | | |
|---|---|---|
| BE | 1012207 | 7/2000 |
| EP | 0326754 | 8/1989 |
| EP | 0405230 | 1/1991 |
| EP | 1454787 | 9/2004 |
| FR | 2246415 | 5/1975 |
| FR | 2587291 | 9/1985 |
| GB | 1601930 | 11/1981 |
| GB | 2332405 | 6/1999 |
| GB | 2342327 | 4/2000 |
| NL | 1016924 | 6/2002 |
| WO | WO88/06385 | 8/1988 |
| WO | WO96/03305 | 2/1996 |
| WO | WO0185086 | 11/2001 |

OTHER PUBLICATIONS

Dane Industries Product Brochure for QuicKART 1000 Power Pal, 2 pages, 2001.

Dane Industries Product Brochure for QuicKART 2000, 2 pages, 2001.

Dane Industries Product Brochure for PowerPal 3000, 2 pages, 2001.

Dane Industries Product Brochure for QuicKART 5000, 2 pages, 2001.

Declaration of James W. Wiff, Vice President, Engineering and Product Development of Dane Industries, Inc., attaching colored photos showing various hitches observed at the United States Postal Service facility, labeled "Exhibit J", "Exhibit K", "Exhibit L", "Exhibit M" and "Exhibit N", 6 pages, at least as early as the period between Oct. 6, 2004 and Oct. 20, 2004.

Dclaration of David A. Leckey, Executive Vice President of Dane Industries, Inc., attaching colored photos showing a hitch of a motorized shopping cart mover that is configured to receive the rear wheels of a shopping cart, labeled "Exhibit R", "Exhibit S" and "Exhibit T", 4 pages, at least as early as Aug. 4, 2003.

Declaration of William A. Grimes, Senior Vice President of Dane Industries, Inc., attaching a colored photo showing a hitch of a motorized shopping cart mover that is configured to receive the rear wheels of a shopping cart, labeled "Exhibit X", 2 pages, at least as early as Jan. 13, 2003.

Declaration of David Leckey, Executive Vice President of Dane Technologies, Inc., attaching photos showing a motorized Quickart 2000 shopping cart mover with a hitch that allows the Quickart 2000 to move two side-by-side lines of shopping carts, labeled "Exhibit A", "Exhibit B" and "Exhibit C", 4 pages, at least as early as Oct. 27, 2003.

Declaration of William A. Grimes, Senior Vice President of Dane Industries, Inc., attaching photos showing a motorized shopping cart mover and hitch, labeled "Exhibit E" and "Exhibit F", and showing a motorized shopping cart mover employing a second type of hitch for attaching to a shopping cart, labeled "Exhibit G", "Exhibit H" and "Exhibit", 6 pages, at least as early as Autumn 2004.

Declaration of William A. Grimes, Senior Vice President of Retail Sales of Dane Industries, Inc., attaching photos showing a motorized shopping cart mover with a hitch that is configured to attach to a shopping cart, labeled "Exhibit O", "Exhibit P"and "Exhibit Q", 4 pages, at least as early as 2001.

Declaration of William A. Grimes, Senior Vice President of Retail Sales of Dane Industries, Inc., attaching photos showing a motorized shopping cart mover that is configured to enter the rear of a shopping cart, labeled "Exhibit U", "Exhibit V"and "Exhibit V", 4 pages, at least as early as Aug. 31, 2004.

Declaration of James W. Wiff, Vice President, Engineering and Product Development of Dane Industries, Inc., attaching photos showing a collapsible pallet, labeled "Exhibit AA" and "Exhibit BB", 3 pages, at least as early as May 21, 2004.

Declaration of Paul D. Holtan, Senior Staff Engineer at Dane Industries, Inc., attaching photos showing a hitch for attachment to a motorized shopping cart mover, labeled "Exhibit X", "Exhibit XI", "Exhibit XII", "Exhibit XIII", "Exhibit XIV", "Exhibit XV", "Exhibit XVI", "Exhibit XVII" and "Exhibit XVII", at least as early as Jan. 1, 2002.

Non-Final Office Action, U.S. Appl. No. 11/682,562, 13 pages, Jan. 9, 2008.

Non-Final Office Action, U.S. Appl. No. 11/361,136, 10 pages, Jan. 10, 2008.

Non-Final Office Action, U.S. Appl. No. 11/254,564, 18 pages, Jan. 9, 2008.

Restriction Requirement, U.S. Appl. No. 10/836,593, 6 pages, Nov. 23, 2005.

Amendment and Response to Restriction Requirement, U.S. Appl. No. 10/836, 593, 9 pages, Dec. 21, 2005.

Non-Final Office Action, U.S. Appl. No. 10/836,593, 20 pages, Feb. 13, 2006.

Amendment and Response to Non-Final Office Action, U.S. Appl. No. 10/836,593, 15 pages, Jul. 5, 2006.

Final Office Action, U.S. Appl. No. 10/836,593, 18 pages, Sep. 15, 2006.

Amendment and Response to Final Office Action, U.S. Appl. No. 10/836,593, 16 pages, Nov. 7, 2006.

Non-Final Office Action, U.S. Appl. No. 10/836,593, 17 pages, Jan. 22, 2007.

Amendment and Response to Non-Final Office Action, U.S. Appl. No. 10/836,593, 21 pages, May 22, 2007.

Final Office Action, U.S. Appl. No. 10/836,593, 22 pages, Aug. 14, 2007.

Amendment and Response to Office Action, U.S. Appl. No. 10/836,593, 15 pages, Oct. 31, 2007.

Non-Final Office Action, U.S. Appl. No. 10/836,593, 18 pages, Nov. 28, 2007.

Preliminary Amendment, U.S. Appl. No. 11/017,975, 10 pages, Mar. 3, 2005.

Restriction Requirement, U.S. Appl. No. 11/017,975, 5 pages, Jul. 26, 2005.

Amendment and Response to Restriction Requirement, U.S. Appl. No. 11/017,975, 12 pages, Aug. 23, 2005.

Non-Final Office Action, U.S. Appl. No. 11/017,975, 7 pages, Jan. 4, 2006.

Amendment and Response to Non-Final Office Action, U.S. Appl. No. 11/017,795, 16 pages, May 1, 2006.

Final Office Action, U.S. Appl. No. 11/017,795, 11 pages, Oct. 6, 2006.

Amendment and Response to Final Office Action, U.S. Appl. No. 11/017,795, 9 pages, Dec. 6, 2006.

Notice of Allowance, U.S. Appl. No. 11/017,795, 6 pages, Jan. 5, 2007.

Restriction Requirement, U.S. Appl. No. 10/965,281, 5 pages, Dec. 8, 2005.

Amendment and Response to Restriction Requirement, U.S. Appl. No. 10/965,281, 13 pages, Feb. 2, 2006.

Non-Final Office Action, U.S. Appl. No. 10/965,281, 15 pages, Mar. 28, 2006.

Amendment and Response to Non-Final Office Action, U.S. Appl. No. 10/965,281, 19 pages, Aug. 25, 2006.

Final Office Action, U.S. Appl. No. 10/965,281, 11 pages, Oct. 27, 2006.

Non-Final Office Action, U.S. Appl. No. 10/280,157, 7 pages, Apr. 1, 2003.

Amendment and Response to Non-Final Office Action, U.S. Appl. No. 10/280,157, 6 pages, May 1, 2003.

Non-Final Office Action, U.S. Appl. No. 10/280,157, 7 pages, Oct. 22, 2003.

Amendment and Response to Non-Final Office Action, U.S. Appl. No. 10/280,157, 13 pages, Mar. 22, 2004.

Final Office Action, U.S. Appl. No. 10/280,157, 7 pages, Jul. 15, 2004.

Amendment and Response to Final Office Action, U.S. Appl. No. 10/280,157, 8 pages, Aug. 24, 2004.

Notice of Allowance, U.S. Appl. No. 10/280,157, 5 pages, Oct. 6, 2004.

Restriction Requirement, U.S. Appl. No. 11/696,534, 6 pages, Apr. 21, 2008.

Response to Restriction Requirement, U.S. Appl. No. 11/696,534, 11 pages, May 21, 2008.

Nonfinal Office Action U.S. Appl. No. 11/696,534, 17 pages, Jul. 17, 2008.

Response to Nonfinal Office Action U.S. Appl. No. 11/696,534, 6 pages, Oct. 17, 2008.

Amendment and Response to Non-Final Office Action, U.S. Appl. No. 11/682,562, 14 pages, May 9, 2008.

Final Office Action, U.S. Appl. No. 11/682,562, 10 pages, Aug. 21, 2008.

Amendment and Response to Non-Final Office Action, U.S. Appl. No. 11/361,136, 9 pages, May 9, 2008.

Final Office Action, U.S. Appl. No. 11/361,136, 10 pages, Sep. 8, 2008.

Amendment and Response to Non-Final Office Action, U.S. Appl. No. 11/254,564, 21 pages, May 9, 2008.

Final Office Action, U.S. Appl. No. 11/254,564, 18 pages, Sep. 16, 2008.

Response to Final Office Action, U.S. Appl. No. 11/254,564, filed Dec. 16, 2008.

Notice of Allowance, U.S. Appl. No. 11/254,564, Jan. 12, 2009 4 pages.

Non-Final Office Action, U.S. Appl. No. 11/184,095, 21 pages, Apr. 4, 2008.

Notice of Appeal and Pre-Appeal Brief Conference Request, U.S. Appl. No. 10/836,593, 9 pages, Apr. 17, 2008.

Amendment and Response, U.S. Appl. No. 10/836,593, 17 pages Jan. 16, 2009.

Notice of Allowance U.S. Appl. No. 12/125,138, 8 pages, Oct. 20, 2008.

* cited by examiner

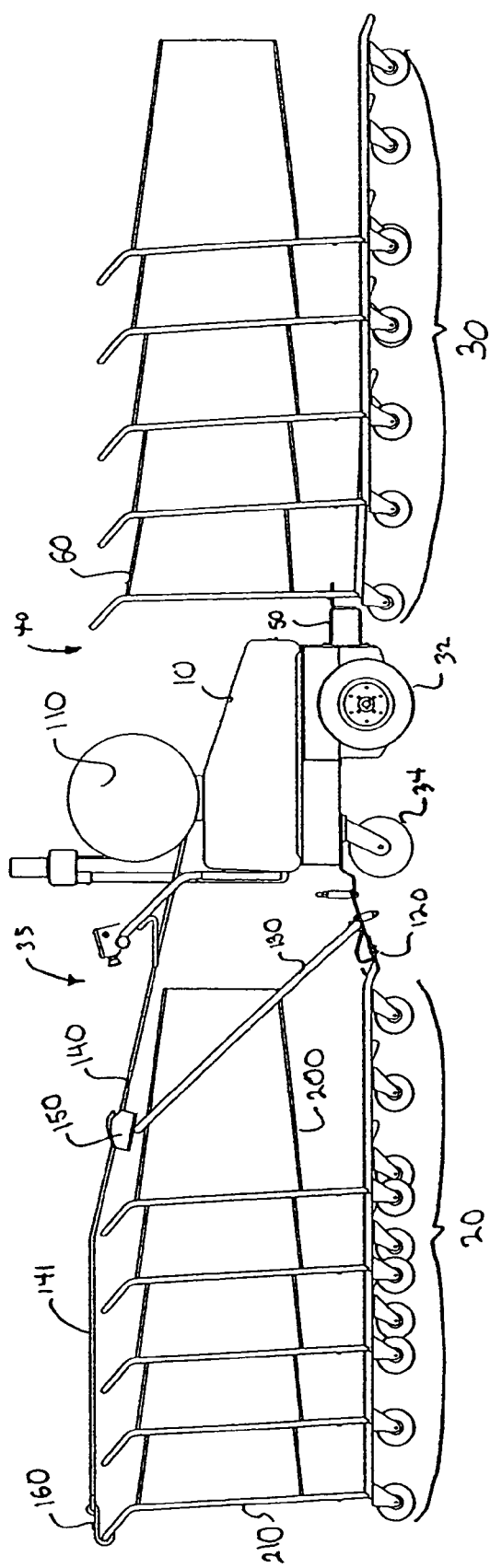
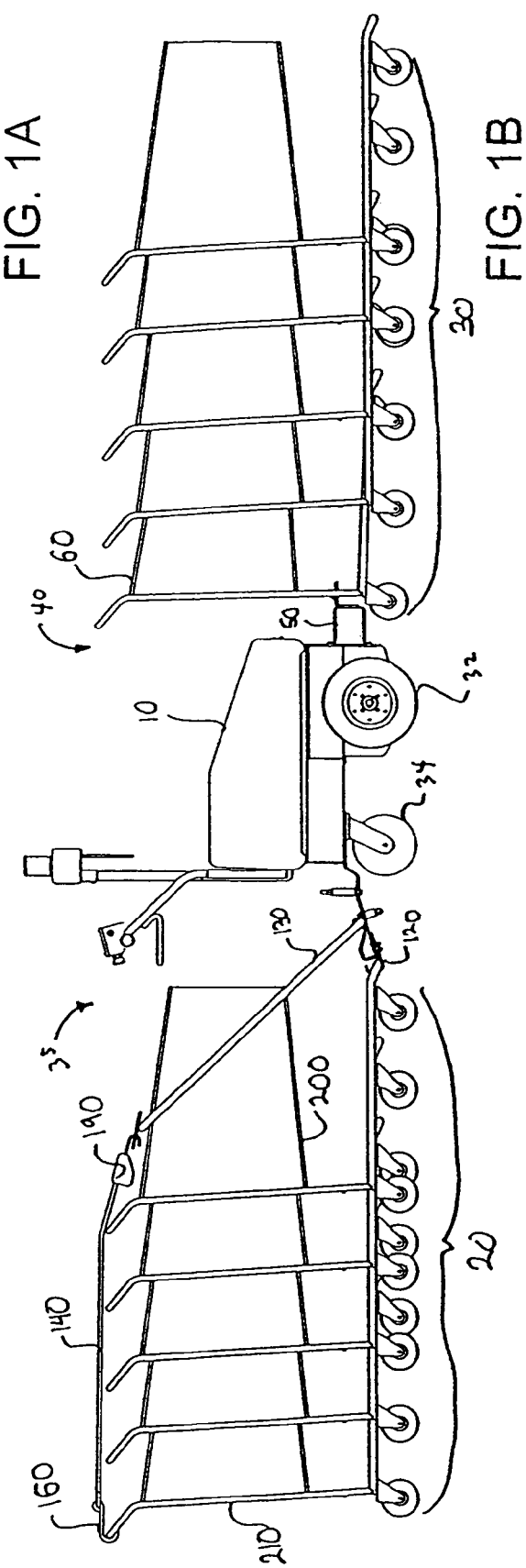
FIG. 1A
FIG. 1B

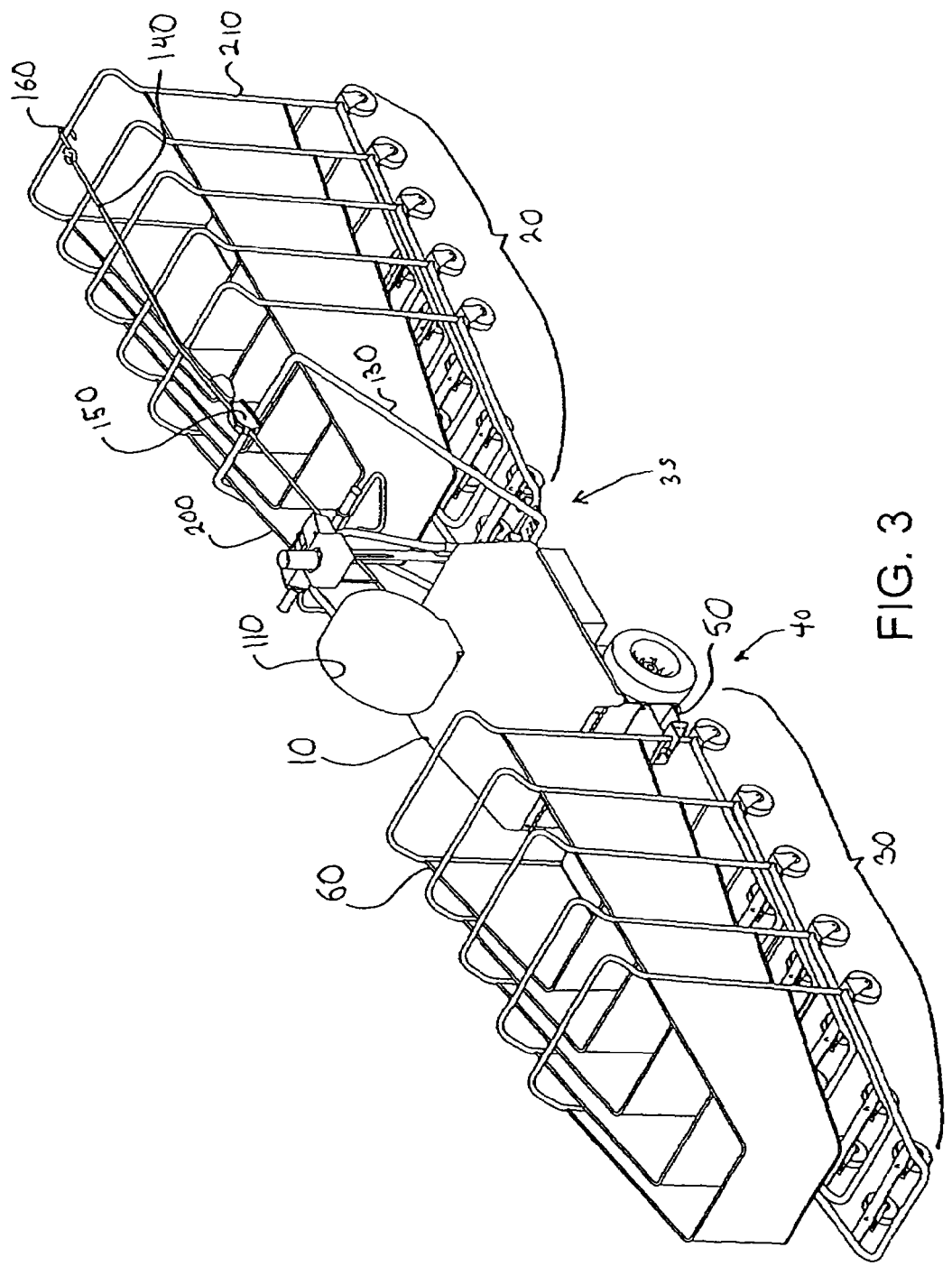

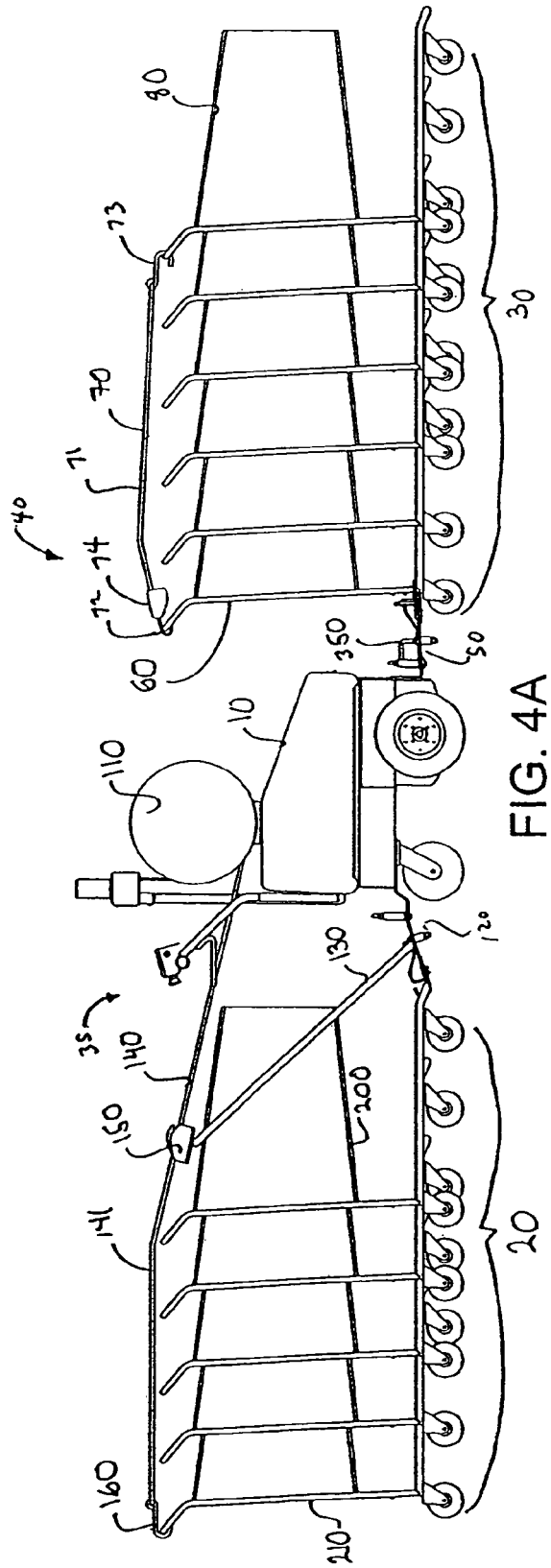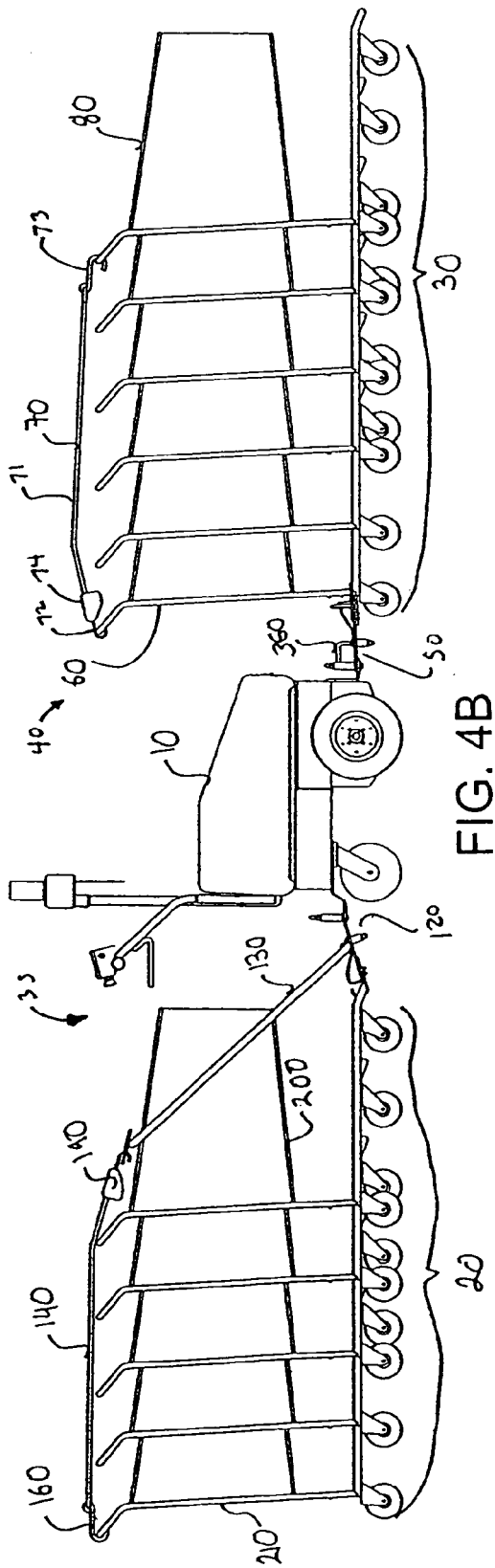
FIG. 4A
FIG. 4B

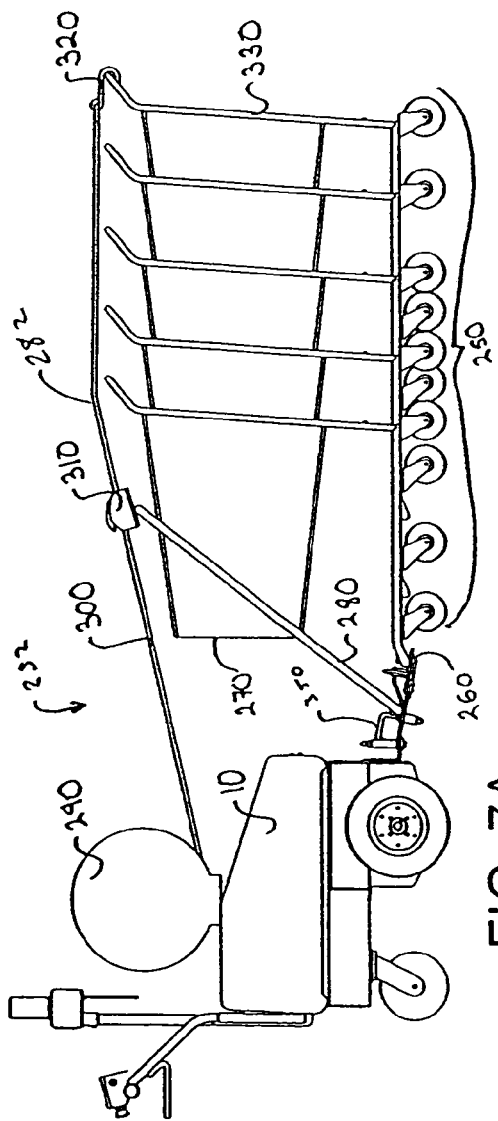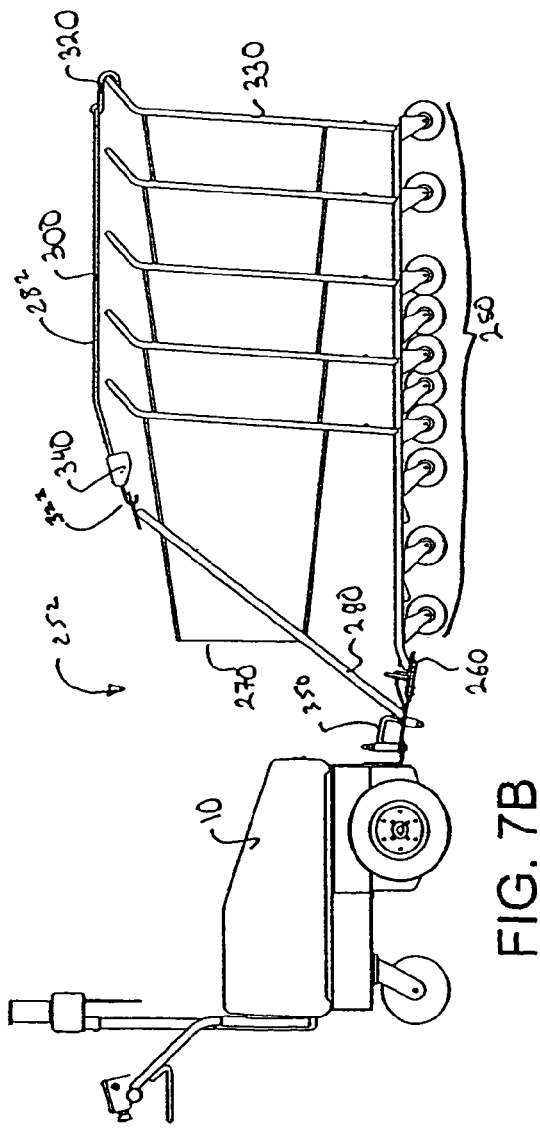
FIG. 7A
FIG. 7B

PUSH-PULL CART COLLECTION DEVICE AND CONVERSION ASSEMBLY

CROSS-REFERENCE TO RELATED APPLICATION

The present application is a continuation-in-part of U.S. patent application Ser. No. 10/965,281 ("the '281 application"), which was filed on Oct. 14, 2004. The '281 application claims priority to U.S. Provisional Patent Application No. 60/511,786 ("the '786 application"), which was filed on Oct. 15, 2003. The present application also claims priority to U.S. Provisional Patent Application No. 60/653,819 ("the '819 application"), which was filed on Feb. 17, 2005. The contents of all of the aforementioned applications are incorporated herein by reference in their entireties.

FIELD OF THE INVENTION

The present invention relates to devices and methods for assisting in the retrieval of wheeled shopping carts in parking lots. More specifically, the present invention relates to devices and methods for retrieving shopping carts by moving them in a train-like manner.

BACKGROUND OF THE INVENTION

Retrieving shopping carts in large parking lots has been primarily a manual task. Workers push or pull a column of stacked wheeled shopping carts from various collection areas located throughout the parking lots. The longer the column of carts being pushed or pulled, the more difficult it becomes to control. Even with more than one worker, the collecting and guiding of long columns of carts is difficult and time consuming. Furthermore, in large parking lots, workers must push or pull the column of carts great distances. The retrieval task can be physically exhausting and may result in injury to the workers. Carts also can be damaged as the workers struggle to push or pull long columns to the store door.

In response to the difficulties associated with manual retrieval of shopping carts, motorized cart retrieval devices have been developed for pushing or pulling lines or columns of shopping carts through parking lots in a train-like fashion.

In the case of a "pushing device," the motorized device is secured to the back of a first shopping cart by an operator. The operator then appends additional carts to the first cart, thereby creating a train of shopping carts situated in front of the pushing device. In operation, the pushing device is controlled either manually or by remote control. Manual operation often requires at least two operators, one at the back end of the train to control the device and one at the forward end of the train to guide the train. Remote operation allows a single operator to guide the train of shopping carts at the forward end of the train while controlling the pushing device at the back end of the train with a remote control.

Examples of "pushing" type motorized shopping cart retrievers are disclosed in: U.S. application Ser. No. 10/965, 281, which was filed on Oct. 14, 2004; U.S. Pat. No. 5,934, 694 to Schugt et al., which issued Aug. 10, 1999; and U.S. Pat. No. 6,220,379 to Schugt et al., which issued Apr. 24, 2001. The aforementioned patents and patent application are hereby incorporated by reference in their entireties into the present application.

In the case of a "pulling device," the motorized device is situated at the forward end of the train of shopping carts to lead the train by pulling the train. The train of shopping carts is situated behind the device and attached to the device with a rope, cable, or the like, which extends from the motorized device and may be fastened to or around the last cart in the train of carts. Each time a cart is added to the train, the rope is unfastened from the previous cart, extended further and then secured to the cart added at the end of the train. The operator walks alongside the motorized device as it pulls the train. When adding additional carts to the end of the train, a pulling device requires operators at both ends of the train or requires the operator to run back and forth between the forward end and the back end of the train because operations occur at both ends of the train of carts.

The desirability of a pushing device or a pulling device depends on various factors, including the number of carts being collected, the physical characteristics of the parking lot or location being navigated, the weather conditions, and the number of operators available, among others. Notably, these factors may vary from time to time, but it may not be cost-effective to invest in two sets of cart retrieval devices, one for pushing and one for pulling. For instance, where a cart collection device includes three wheels—two larger powered wheels on a single axle for propelling the collection device and a smaller swivel wheel for steering the device—it may be advantageous to change the direction of the device in inclement weather. Specifically, the ability to readily place the larger wheels before or after the smaller wheel as desired leverages the benefits of the difference in wheel size for navigating snowy or muddy terrain or the like.

A shopping facility may employ more than one type of shopping cart. Each type of shopping cart may have a size and/or configuration that is different from the other types of shopping carts employed at the shopping facility. The size and/or configuration differences may cause one type of shopping cart to be incompatible with another type of shopping cart with respect to forming a train of carts to be moved by a motorized cart retrieval device. Consequently, each type of cart has to be gathered separately from the other types of shopping carts, thereby reducing productivity.

Often, the length of a train of shopping carts being moved by a motorized cart retrieval device is limited by the structural strength of the type of cart being moved, not by the capabilities of the motorized cart retrieval device. As a result, the capacity of the motorized cart retrieval device in underutilized, requiring additional trips and reducing productivity.

There is a need in the art for a device for, and method of, moving shopping carts that increases productivity and improves operational condition adaptability.

BRIEF SUMMARY OF THE INVENTION

The present invention, in one embodiment, is a shopping cart collection device adapted to engage first and second shopping carts and capable of pulling a first train of shopping carts extending from the first shopping cart and pushing a second train of shopping carts extending from the second shopping cart. The device comprises a motorized unit comprising a drive wheel, a first hitch and a second hitch. The first hitch is proximate a first side of the motorized unit and is adapted to engage the first shopping cart. The second hitch is proximate a second side of the motorized unit opposite the first side and is adapted to engage the second shopping cart.

The present invention, in one embodiment, is a shopping cart collection device adapted to engage a first shopping cart and pull or push a train of shopping carts extending from the first shopping cart. The device comprises a motorized unit comprising a drive wheel and a hitch coupled to the motorized unit. The hitch comprises first and second engagement features. The first engagement feature is adapted to engage a rear end portion of the first shopping cart. The second engagement feature is adapted to engage a front end portion of the first shopping cart.

The present invention, in one embodiment, is a hitch mountable on a motorized shopping cart collection device. The hitch is configured to allow the device to both push and pull a train of shopping carts extending from a first shopping cart engaged by the hitch, wherein the first shopping cart has a front end and a rear end. The hitch comprises a mounting plate and a pivot plate. The mounting plate is mountable to the device. The pivot plate is selectively pivotally coupled to the mounting plate and comprises a front end engaging feature, a rear end engaging feature, and a member adapted to pivotally lock or unlock the pivot plate relative to the mounting plate.

The present invention, in one embodiment, is a method of collecting shopping carts with a motorized shopping cart collection device. The method comprises coupling a first train of shopping carts to a first hitch proximate a first side of the device, coupling a second train of shopping carts to a second hitch proximate a second side of the device opposite the first side of the device, and moving the coupled trains with the device such that the device pushes the first train and pulls the second train.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 1A is a side view of the collection device in accordance with one embodiment of the present invention where the device includes a reel for dual-train collection;

FIG. 1B is a side view of the collection device in accordance with one embodiment of the present invention for dual-train collection;

FIG. 3 is a perspective view of the collection device in accordance with one embodiment of the present invention where the device includes a reel for dual-train collection;

FIG. 4A is a side view of the collection device with a distal push coupler in accordance with one embodiment of the present invention where the device includes a reel for dual-train collection;

FIG. 4B is a side view of the collection device with a distal push coupler in accordance with one embodiment of the present invention for dual-train collection;

FIG. 7A is a side view of the collection device in accordance with one embodiment of the present invention where the device includes a reel for dual-directional single-train collection;

FIG. 7B is a side view of the collection device in accordance with one embodiment of the present invention for dual-directional single-train collection;

Figure 2:
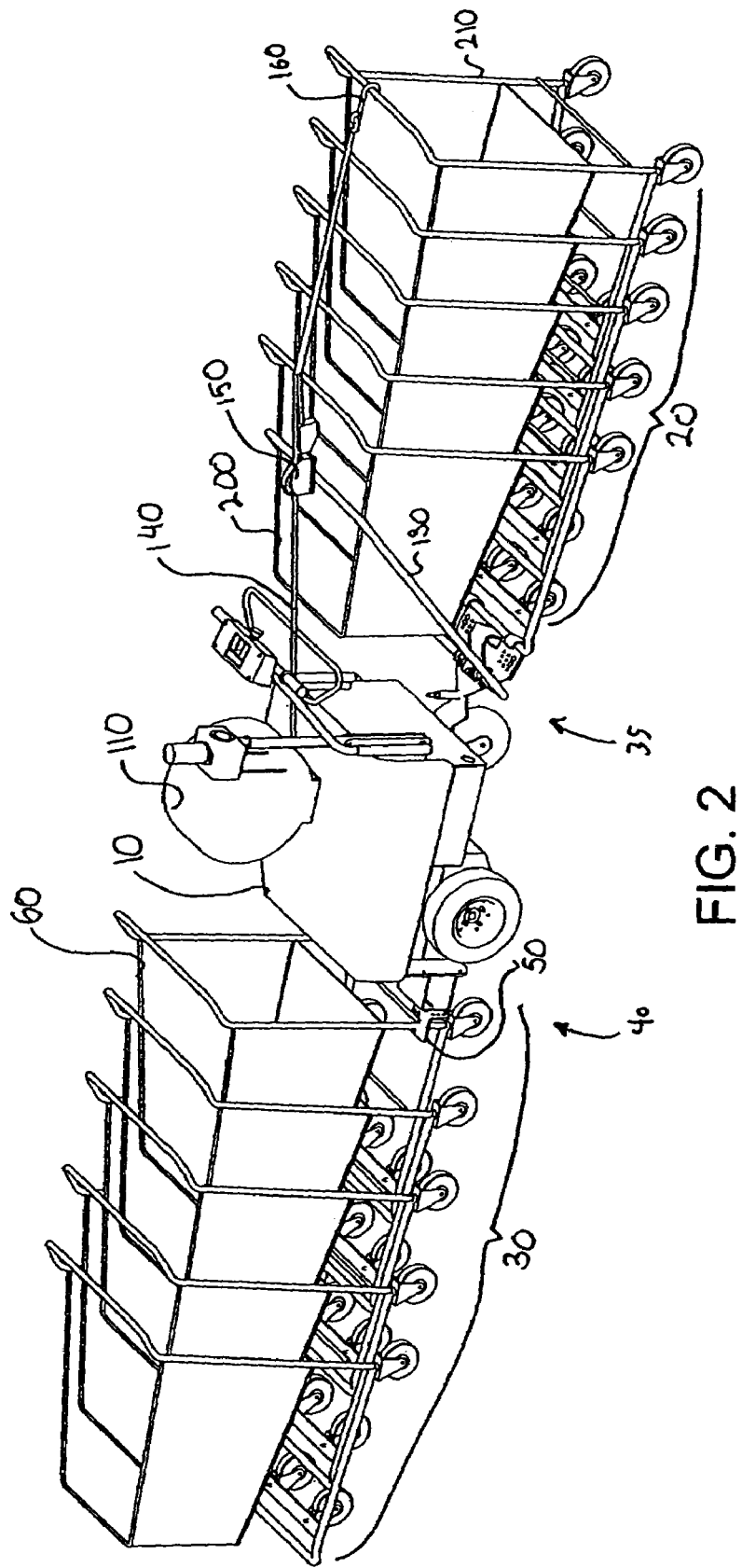
FIG. 2 is a perspective view of the collection device in accordance with one embodiment of the present invention where the device includes a reel for dual-train collection.
Figure 5:
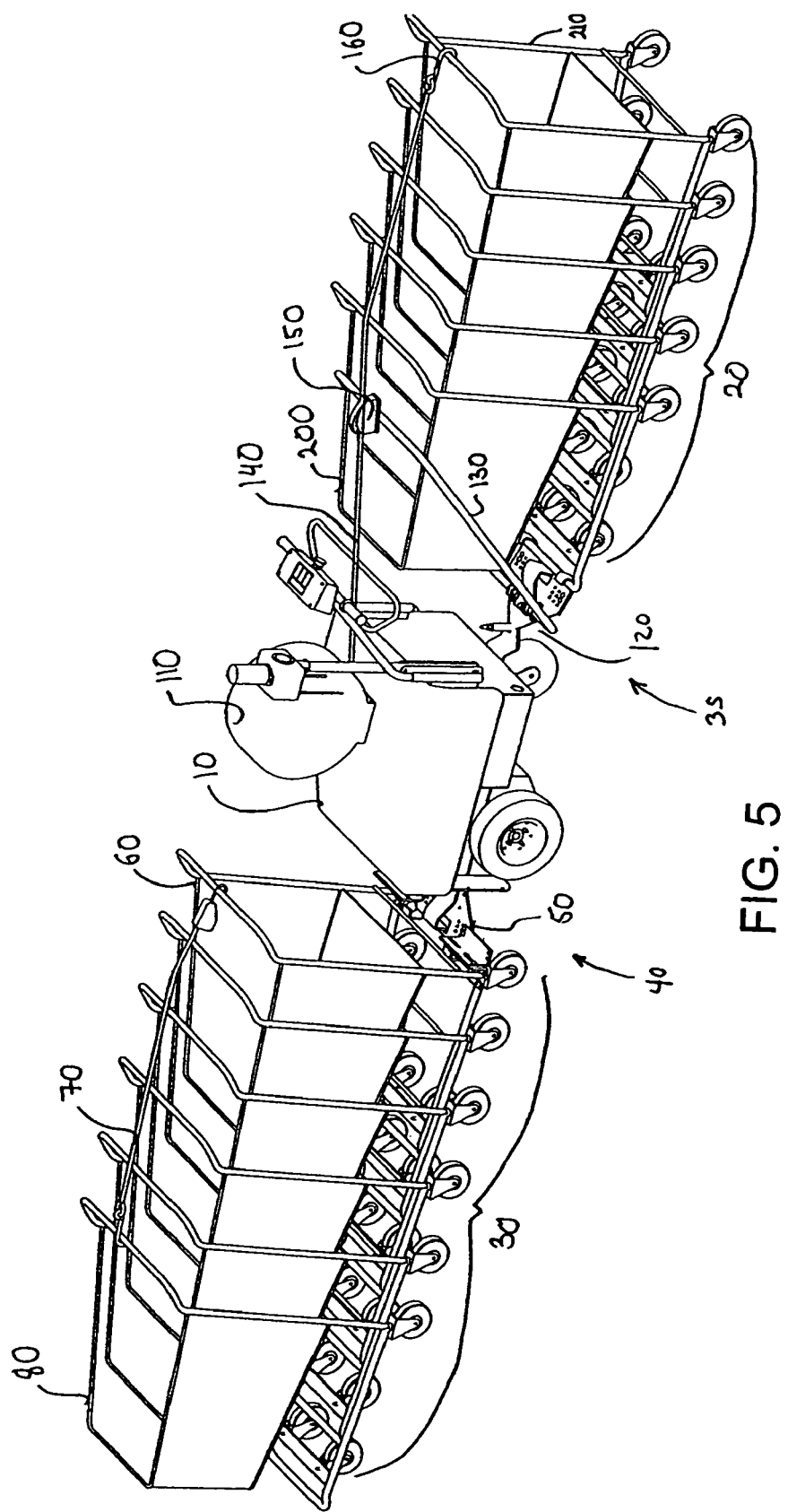
FIG. 5 is a perspective view of the collection device with a distal push coupler in accordance with one embodiment of the present invention where the device includes a reel for dual-train collection.
Figure 6:
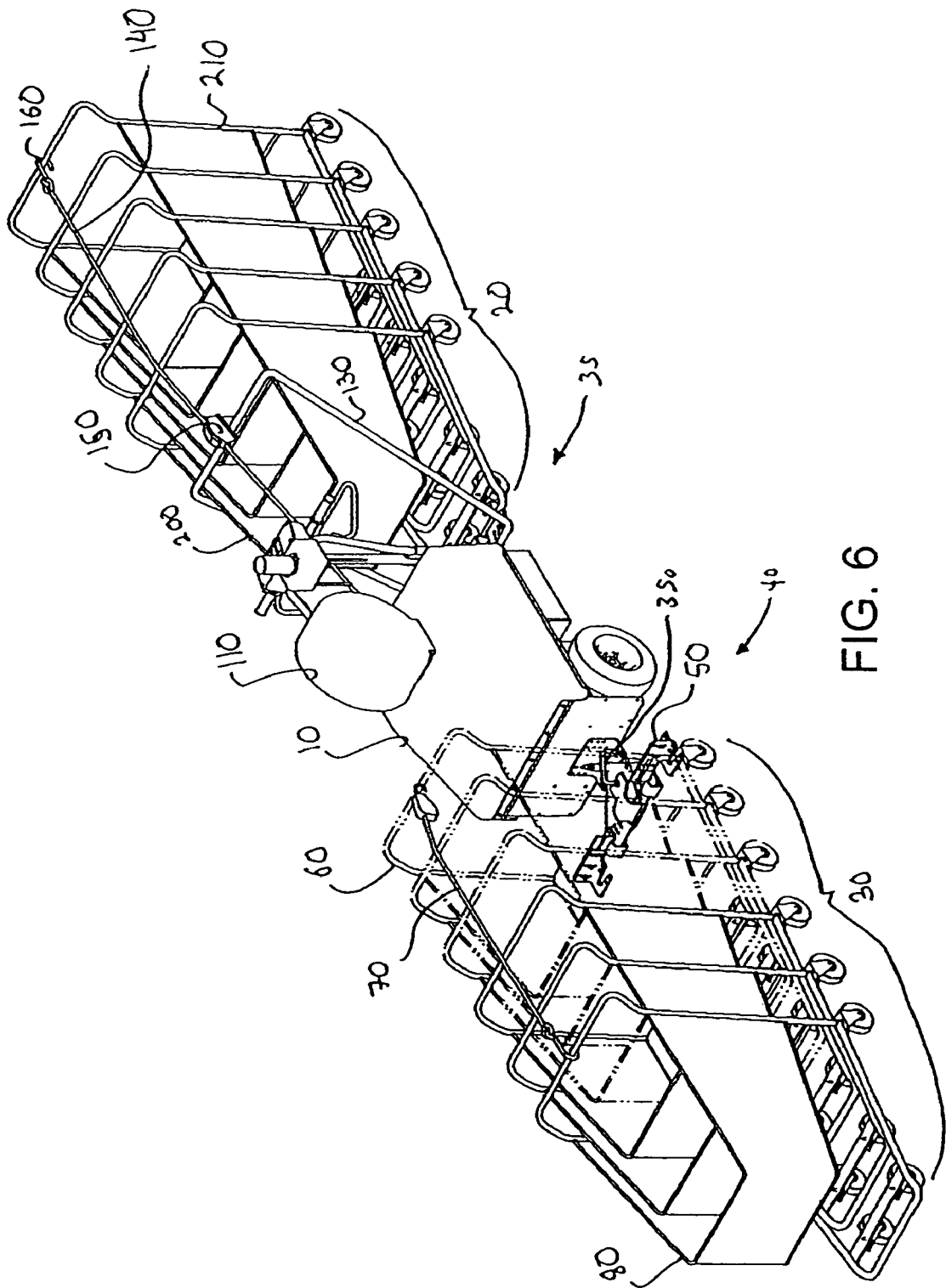
FIG. 6 is a perspective view of the collection device with a distal push coupler in accordance with one embodiment of the present invention where the device includes a reel for dual-train collection.

DETAILED DESCRIPTION OF THE INVENTION a. Overview of Motorized Shopping Cart Collection Devices The present invention is a motorized shopping cart collection device 10 for retrieving wheeled shopping carts in parking lots. The device 10 is configured such that it can pull and/or push train-like lines of shopping carts. In other words, as illustrated in FIGS. 1-6, the device 10 is configured such that it can: (1) pull a rearward train 20 of shopping carts; (2) push a forward train 30 of shopping carts; and (3) both pull a rearward train 20 and push a forward train 30 at the same time.

For at least the following reasons, the present motorized cart collection device 10 is advantageous over the prior art. First, the device 10 can push or pull a train of carts 20, 30 with the device's motorized drive wheel 32 leading or trailing the device's non-drive wheels 34. Thus, the device 10 can be operationally oriented in the manner that is best suited for the operating conditions (e.g., a dry parking lot surface, a parking lot surface covered with snow, ice, water, slush, or mud, and/or a parking lot surface having a grade).

Second, the device 10 can more readily utilize its moving/power capacity and is not as likely to be unduly limited by the structural strength of the carts being moved. Although the length of a train of carts is typically limited by the structural strength of the carts and not the moving capacity of a motorized shopping cart device, the ability of the present device 10 to more readily utilize its full cart moving capability is brought about by the device's ability to move two trains (i.e., a rearward train 20 and a forward train 30) at the same time. As a result, the device 10 is capable of moving two trains 20, 30 of maximum length as allowed by the structural strength of the carts being moved.

Third, the device 10 can move at the same time two types of shopping carts that are incompatible for forming a single train-like line of carts and would otherwise have to be moved in separate trips. For example, shopping carts of a first type could be pulled as a rearward train 20 and shopping carts of a second type cold be pushed as a forward train 30.

Fourth, in situations where a shopping facility employs two types of shopping carts and each type of shopping cart requires its own unique hitching arrangement for hitching the cart to a motorized shopping cart mover, the present device 10 eliminates the need to have two separate motorized cart moving devices with separately configured hitches. As the present device 10 can be equipped with a first type of hitch on its front and a second type of hitch on its rear, the device 10 can move both types of shopping carts.

Each of the aforementioned advantages of the present motorized cart moving device 10 increases production and versatility over prior art motorized cart moving devices. Also, each of the aforementioned advantages of the present motorized cart moving device 10 decreases expenses over prior art motorized cart moving devices.

In operation, the present motorized shopping cart collection device 10 is controlled substantially as described in U.S. Pat. No. 5,934,694 to Schugt et al. (which issued Aug. 10, 1999) and U.S. Pat. No. 6,220,379 to Schugt et al. (which issued Apr. 24, 2001). Both of these patents are hereby incorporated by reference into the present application in their entireties. The collection device 10 receives operation signals from the operator to control the speed and direction of the device 10. The operator provides operation signals to the device 10 via a control module mounted on the device 10 and/or via a remote control module carried by the operator. In either case, the control module transmits the appropriate operation signal from the operator to a drive motor and steering, braking and coupling systems as desired. When the device 10 is operated via the control module mounted on the device 10, the operator is proximate the collection device 10. When the device 10 is operated via the remote control module, a radio transmitter or other wireless communication link in the remote control module allows the operator to control the speed and direction of the collection device 10 without being proximate the device 10.

To gather shopping carts from a parking lot of a shopping facility and transport the carts in a train-like manner to the shopping facility, one or more carts are first coupled/hitched/joined to the front and/or rear of the device 10. As additional shopping carts are encountered as the device 10 and its attached shopping carts are maneuvered around the parking lot, the additional shopping carts are added to the carts already coupled to the device 10. As a result, train-like lines of shopping carts are increasingly extended from the rear and/or front of the device 10.

b. Dual-Train Motorized Shopping Cart Collection Device

For a discussion of a dual-train motorized shopping cart collection device 10, reference is made to FIGS. 1A-6. In one embodiment the motorized cart collection device 10 is coupled to two trains of carts, a rearward train 20 that is coupled to the rear of, and pulled by, device 10 and a forward train 30 that is coupled to the front of, and pushed by, device 10. In one embodiment, rearward hitching assembly 35, which is mounted on the rear of the device 10, couples rearward train 20 to the rear of device 10. In one embodiment, rearward hitching assembly 35 also helps to maintain the carts of rearward train 20 in a train-like bunch. In one embodiment, as depicted in FIGS. 1A-3, forward hitching assembly 40, which is mounted on the front of device 10, couples forward train 30 to the front of device 10. In one embodiment, as depicted in FIGS. 4A-6, forward hitching assembly 40 also helps to maintain the carts of forward train 30 in a train-like bunch.

In one embodiment, as illustrated in FIGS. 1A-3, forward hitching assembly 40 includes hitch 50 mounted on the front end of device 10. Hitch 50 secures rearmost cart 60 of forward train 30 to the front of device 10. In one embodiment, as illustrated in FIGS. 4A-6, forward hitching assembly 40 includes both hitch 50 and bunching coupler 70. Bunching coupler 70 helps to maintain the carts of forward train 30 in a train-like bunch, particularly on downgrades or when the collection device 10 decelerates, thereby preventing the carts of forward train 30 from loosening up. Bunching couplers discussed later in this specification with respect to forward trains perform the same service.

In one embodiment, as shown in FIGS. 1A-6, hitch 50 includes a jaw bar having two jaw members that engage the lower back tubular members of rearmost cart 60 of forward train 30. In one embodiment, hitch 50 additionally includes a locking pin on each jaw member that extends across the open portion of the jaw to lock the respective tubular member of the rearmost cart 60 to the jaw. In other embodiments, a variety of other hitch configurations are implemented without departing from the spirit or scope of this invention. For example, any of the hitch configurations depicted in U.S. application Ser. No. 10/965,281 (which was filed Oct. 14, 2004 and is herby incorporated by reference into the present application in its entirety) are suitable for use with the present invention as hitch 50.

In one embodiment, as depicted in FIGS. 1A-3, hitch 50 will be non-pivotal relative to device 10, and hitch 120 will be pivotal relative to device 10. In one embodiment, hitch 120 will be made selectively pivotal relative to device 10 upon pulling latch rod 350, as discussed with reference to FIG. 11 later in this specification. Non-pivotal hitch 50 is best suited for acting as a pushing hitch for engaging and pushing forward train 30. Pivotal hitch 120 is best suited for acting as a pulling hitch for engaging and pulling rearward train 20. The pivoting capability of a pulling hitch 120 allows device 10 to steer and pull rearward train 20.

In one embodiment, as depicted in FIGS. 4A-6, both hitch 50 and hitch 120 are pivotal hitches and, as a result, both are suited for pulling rearward trains 20. In one embodiment, hitch 50 is selectively pivotal via its latch rod 350 and hitch 120 is strictly pivotal. In another embodiment, hitches 50, 120 are both selectively pivotal when their respective latch rods 350 are pulled to allow hitches 50, 120 to pivot relative to device 10 when pulling rearward trains 20. However, because both hitches 50, 120 are selectively pivotal, they are also suited for pushing forward trains 30 when their respective latch rods 350 are engaged to prevent hitch 50, 120 from pivoting relative to device 10.

As previously mentioned in reference to FIGS. 4A-6, in one embodiment, the carts of the forward train 30 are further secured by being bunched together in a train-like line via bunching coupler 70. Bunching coupler 70 couples foremost cart 80 of forward train 30 to rearmost cart 60. Bunching coupler 70 includes line 71 (e.g., a cable, rope, chain, strap, etc.), two hooks 72, 73, and ratchet 74 for extending and securing line 71 to adjust the length of line 71 to accommodate the length of forward train 30. In one embodiment, bunching coupler 70 couples foremost cart 80 to collection device 10 in a manner similar to that depicted in FIGS. 1A and 4A with respect to the reel 110 discussed later in this specification.

In one embodiment, as shown in FIGS. 1A-6, rearward hitching assembly 35 includes hitch 120, drawbar 130 and bunching coupler 140. Hitch 120 is mounted on the rear end of device 10 and secures the leading end of foremost cart 200 of rearward train 20 to the rear of device 10. Bunching coupler 140 helps to maintain the carts of rearward train 20 in a train-like bunch, particularly on upgrades or when the collection device 10 accelerates, thereby preventing the carts of rearward train 20 from loosening up. Bunching couplers discussed later with respect to a rearward trains perform the same service.

In one embodiment, as shown in FIGS. 1A, 2, 3, 4A, 5 and 6, bunching coupler 140 includes line 141 (e.g., a cable, rope, chain, strap, etc.) that extends from reel 110 mounted on device 10 to rearmost cart 210 of rearward train 20. Bunching coupler 140 further includes hook 160 and clutch 150. Hook 160 attaches to rearmost cart 210. In one embodiment, as illustrated in FIGS. 1A and 4A, line 141 extends through clutch 150 from reel 110 to rearmost cart 210, which is secured by hook 160. Clutch 150 controls the extension of line 141 and hook 160.

In one embodiment, as depicted in FIGS. 1A, 4A, 5 and 6, line 141 is fixedly attached to hook 160. However, in one embodiment, as indicated in FIGS. 2 and 3, line 141 extends through clutch 150 to hook 160 where line 141 is slidably routed around a ring or eyelet of hook 160 and is routed back to clutch 150 to fixedly attach to clutch 150.

As shown in FIGS. 1A-6, draw bar 130 is coupled to, and extends diagonally away from, hitch 120. Hitch 120 receives the "nose" of foremost cart 200. In one embodiment, the clutch 150 is secured to an upper end of the drawbar 130.

In one embodiment, as shown in FIGS. 1A-6, hitch 120 includes jaws or bracket members for engaging the leading horizontal tubular member of the foremost cart 200 of the rearmost train 20. In one embodiment, hitch 120 additionally includes a locking pin on each jaw or bracket member that extends across the open portion of the jaw or bracket member to lock the tubular member of the rearmost cart 200 to the jaw or bracket member. In other embodiments, a variety of other hitch configurations are implemented without departing from the spirit or scope of this invention. For example, many of the hitch configurations depicted in U.S. application Ser. No. 10/965,281 (which was filed Oct. 14, 2004 and is herby incorporated by reference into the present application in its entirety) are suitable for use with the present invention as hitch 120.

In one embodiment, as shown in FIGS. 1B and 4B, collection device 10 is not equipped with reel 110. Instead, bunching coupler 140 includes line 141 (e.g., a cable, rope, chain, strap, etc.), hook 160 and ratchet 190. Line 141 extends from ratchet 190 to hook 160. Ratchet 190 is coupled via a hook to foremost cart 200 of rearmost train 20, and hook 160 is coupled to the rearmost cart 210 of rearmost train 20. Ratchet 190 removes or adds slack to bunching coupler 140 to adjust the length of bunching coupler 140 to accommodate the length of rear train 20.

As can be understood from FIGS. 1A-6, the configuration of rearward hitching assembly 35 is such that when collection device 10 pulls rearward train 20, the force exerted on train 20 is borne by drawbar 130, which transfers the force to the hitch 120 and into the rear of collection device 10. More specifically, the pulling force is directed through line 141 and drawbar 130 to hitch 120 rather than through the frame of foremost cart 200 and into hitch 120. This force transfer configuration tends to subject the carts to compressive forces, rather than tension forces, which are more likely to cause damage to the carts. Also, the configuration provides for a stable towing arrangement that resists tipping, even in situations when device 10 and rearward train 20 jack-knife.

In one embodiment, reel 110 is spring biased or otherwise mechanically retractable such that line 141 can be extended to rearmost cart 210 while retaining tension in line 141. As additional carts are added to rearward train 20, line 141 is extended from reel 110 such that hook 160 can be attached to rearmost cart 210. In one embodiment, line 141 is maintained in position via clutch 150 being locked. In one embodiment, line 141 is maintained in position via a lock mechanism on reel 110. Upon all carts of rearward train 20 being removed from device 10, line 141 can be retracted into reel 110 such that clutch 150 and/or hook 160 are proximate reel 110.

c. Push-Pull Motorized Shopping Cart Collection Device

Figure 8A:
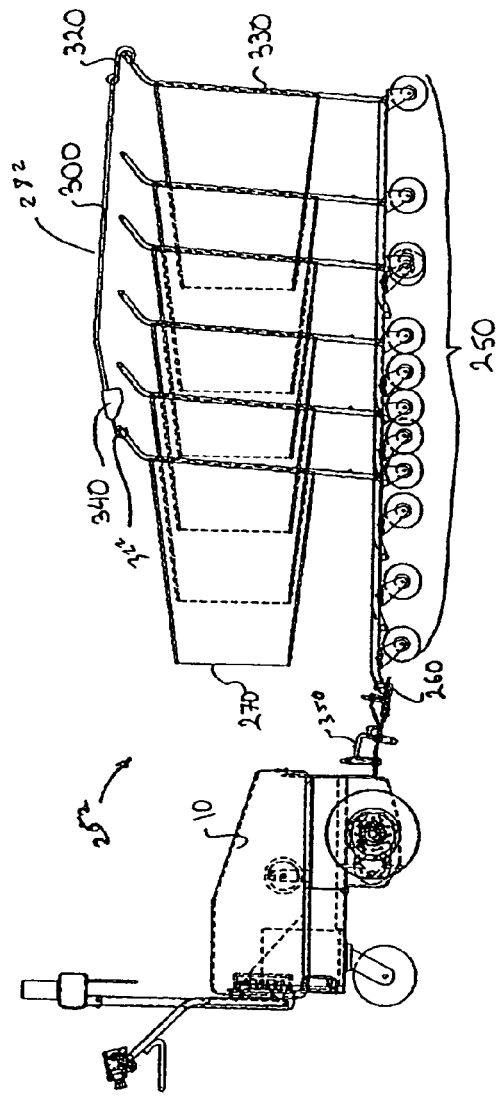
FIG. 8A is a side view of the collection device in accordance with one embodiment of the present invention for dual-directional single-train collection.
Figure 8B:
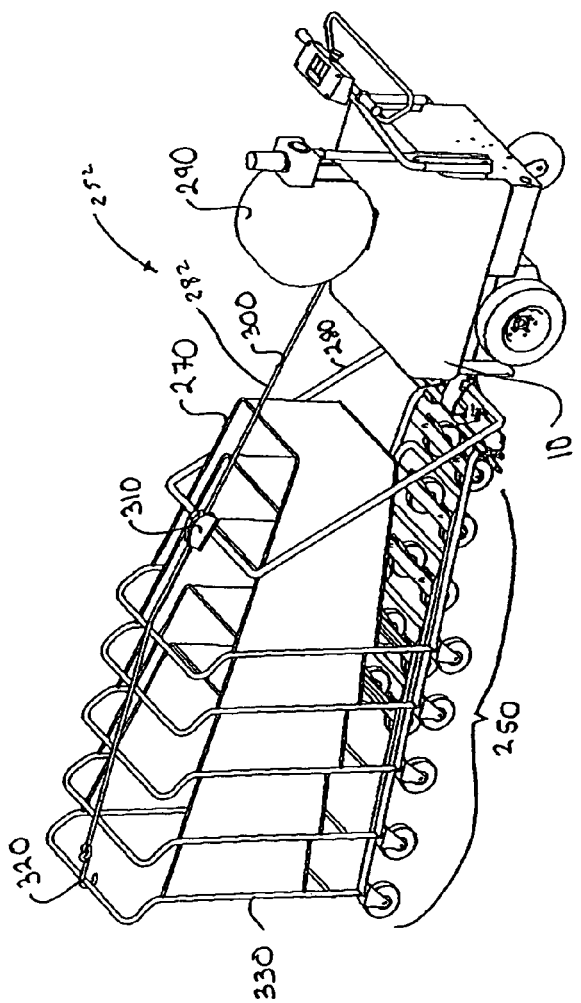
FIG. 8B is a perspective view of the collection device in accordance with one embodiment of the present invention where the device includes a reel for dual-directional single-train collection.
Figure 9:
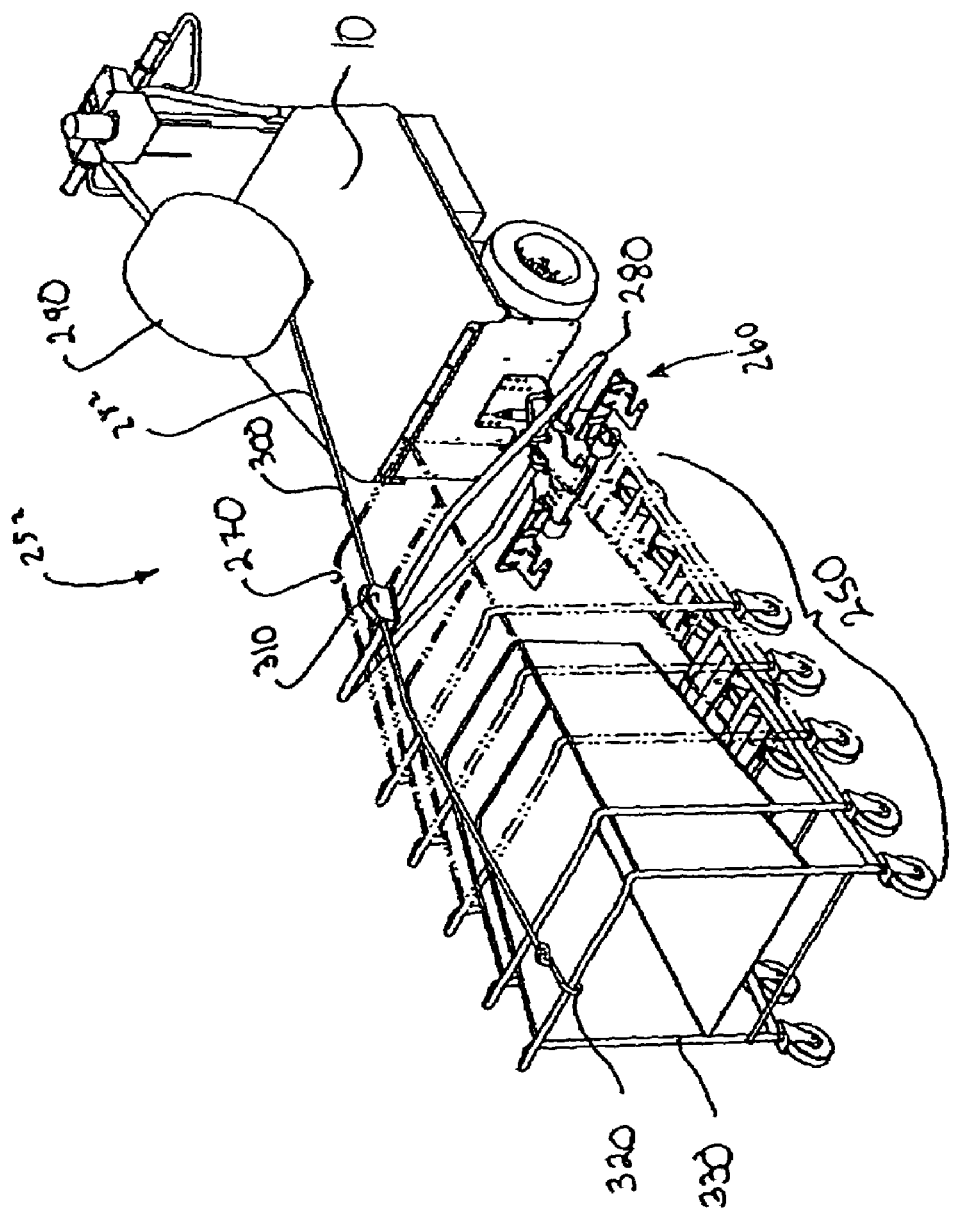
FIG. 9 is a perspective view of the collection device in accordance with one embodiment of the present invention where the device includes a reel for dual-directional single-train collection.

For a discussion of a push-pull motorized shopping cart collection device 10, reference is made to FIGS. 7A, 7B, 8A, 8B, and 9. In one embodiment, collection device 10 is a dual-directional device 10 for moving a single train-like line of carts ("train 250") with a push-pull hitch assembly 252. In one embodiment, as shown in FIGS. 7A, 8B, and 9, the push-pull hitch assembly 252 includes hitch 260, drawbar 280, and bunching coupler 282. Bunching coupler 282 includes reel 290, clutch 310, hook 320 and line 300 (e.g., a cable, rope, chain, strap, etc.).

As best understood from FIG. 9 and as discussed in greater detail later in this specification, in one embodiment, hitch 260 has engagement features that allow hitch 260 to engage horizontal or vertical tubular members of a shopping cart. Thus, hitch 260 can engage the front or rear of a shopping cart.

As indicated in FIGS. 7A, 7B, 8B and 9, hitch 260 engages a horizontal tubular structural member of the leading end of proximate cart 270 to secure cart 270 to device 10. Drawbar 280 is attached to, and extends diagonally away from, hitch 260. Drawbar 280 receives the "nose" of proximate cart 270. Clutch 310 is secured to the horizontal portion of drawbar 280 and controls the extension of line 300 and hook 320 from reel 290 to distal cart 330, which is secured thereby. Bunching coupler 282 helps to maintain the carts of train 250 grouped together in a train-like line. Bunching coupler 282 also helps to transfer pulling forces to drawbar 280 when device 10 is pulling train 250.

In one embodiment, as shown in FIG. 7B, push-pull hitch assembly 252 includes hitch 260, drawbar 280, and bunching coupler 282. Bunching coupler 282 includes ratchet latch 340, line 300, and hook 320, but does not include reel 290. Hitch 260 engages a horizontal tubular structural member of the leading end of proximate cart 270 to secure cart 270 to device 10. Drawbar 280 is attached to, and extends diagonally away from, hitch 260. Drawbar 280 receives the "nose" of proximate cart 270. Ratchet latch 340 is secured to the horizontal portion of drawbar 280 via hook 322. Ratchet latch 340 contains and controls the extension of line 300 and hook 320 from ratchet latch 340 to distal cart 330, which is secured thereby. Bunching coupler 282 helps to maintain the carts of train 250 grouped together in a train-like line. Bunching coupler 282 also helps to transfer pulling forces to drawbar 280 when device 10 is pulling train 250.

In one embodiment, as shown in FIG. 8A, push-pull hitch assembly 252 includes hitch 260 and bunching coupler 282, but does not include drawbar 280. Bunching coupler 282 includes ratchet latch 340, line 300, and hook 320, but does not include reel 290. Hitch 260 engages a horizontal tubular structural member of the leading end of proximate cart 270 to secure cart 270 to device 10. Ratchet latch 340 is secured to proximate cart 270 via hook 322. Ratchet latch 340 contains and controls the extension of line 300 and hook 320 from ratchet latch 340 to distal cart 330, which is secured thereby. Bunching coupler 282 helps to maintain the carts of train 250 grouped together in a train-like line. Bunching coupler 282 also helps to transfer pulling forces to proximate cart 270 and, ultimately, hitch 260 when device 10 is pulling train 250.

As can be understood from FIGS. 7A-9, collection device 10, when equipped with push-pull hitch assembly 260, is operable in a push mode and pull mode and is easily and readily changeable therebetween in response to the needs of the operator and the encountered operational conditions (e.g., parking lot surface slope and slickness, shopping cart type, etc.). A user can manually or remotely operate device 10 in the push mode to propel train 250 in front of device 10. When operating device 10 in the push mode, train 250 can be pushed and maneuvered to "nose-in" a loose single cart or train of carts. In one embodiment, line 300 is then extended to engage the distal cart 330 with hook 320.

Figure 11:
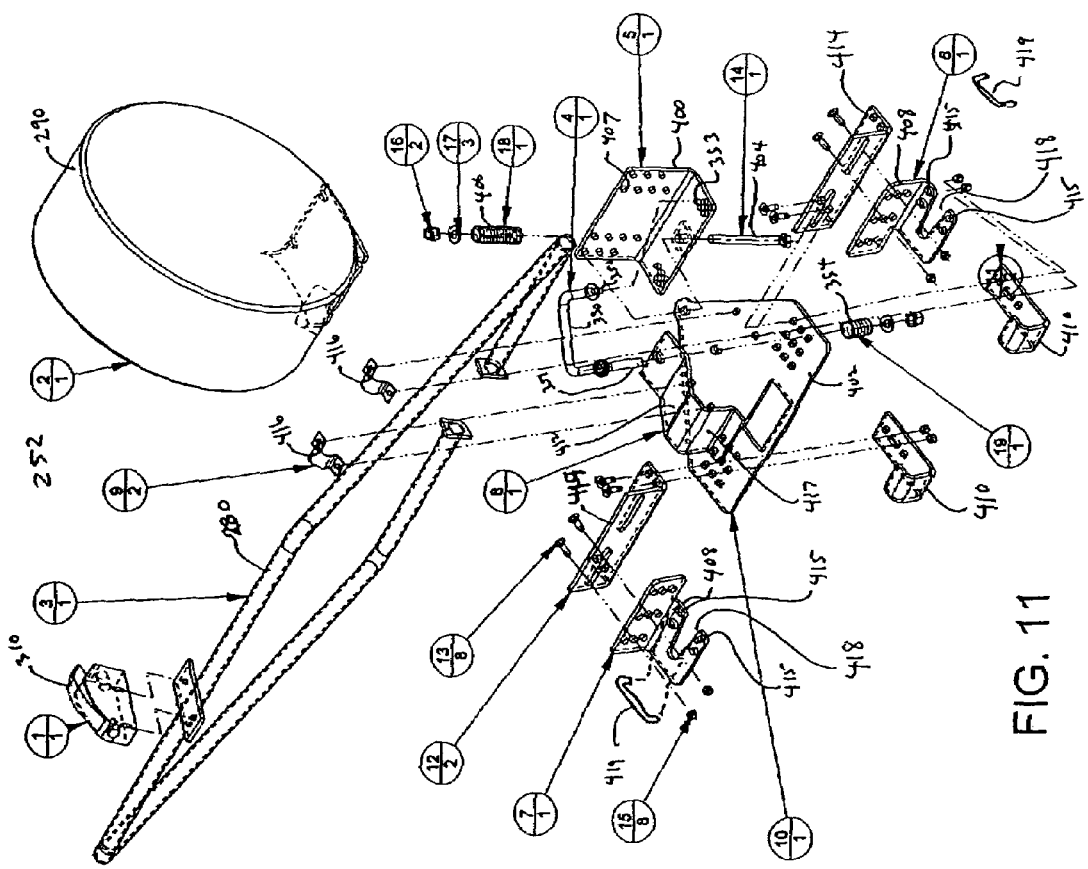
FIG. 11 is an exploded perspective view of the push-pull hitch assembly.

As can be understood from FIGS. 7A-9, hitch 260 is selectively pivotal. As a result, pulling up latch rod 350 (which is shown in FIG. 11 and discussed later in this specification) to unlock hitch 260, allows hitch 260 to pivot relative to device 10. Device 10 can then operate in the pull mode. Specifically, because hitch 260 can pivot relative to device 10, device 10 can make a turn and train 250 will follow as device 10 pulls and steers train 250. To return to the push mode, latch rod 350 is reinserted to lock hitch 260 such that hitch 260 does not pivot relative to device 10.

When operating device 10 in the push mode, it is preferred to use the remote control to control device 10 as the operator walks along side the leading cart of train 250 to steer train 250. Operating device 10 in such a manner avoids the need to have a second operator (i.e., one operator to control device 10 and one operator to guide the leading cart of train 250). However, should an extra operator be available, device 10 can still be controlled manually as opposed to remotely.

When operating device 10 in the pull mode, device 10 can be controlled manually as the operator walks along side of device 10. Device 10 can also be operated remotely when in the pull mode, and doing so allows the operator to stay near the free end of train 250 to add additional carts.

d. Push-Pull Hitch Assembly

Figure 10:
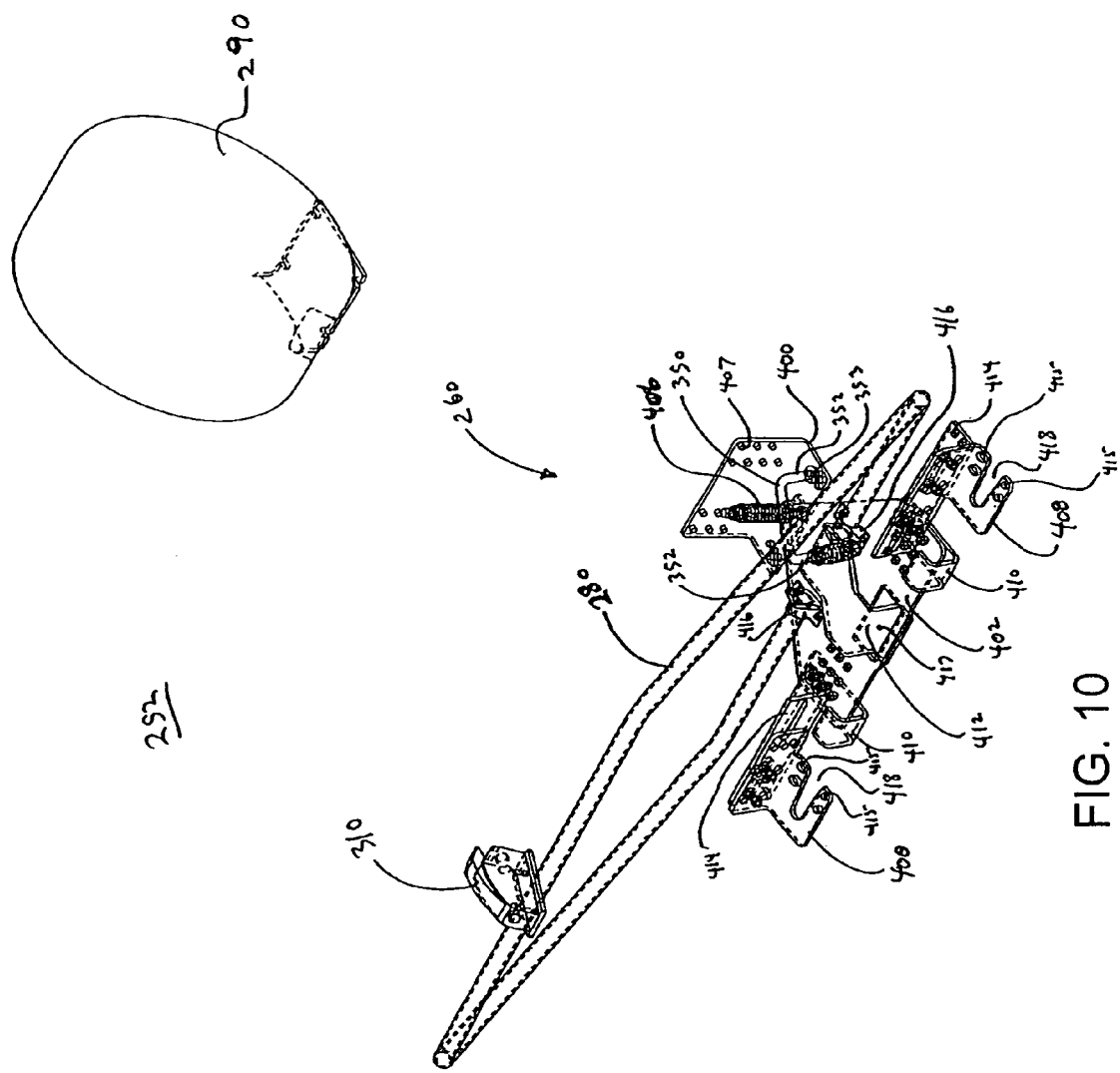
FIG. 10 is a perspective view of the assembled push-pull hitch assembly.

For a discussion of the push-pull hitch assembly 252 depicted in FIG. 7A-9, reference is made to FIGS. 10-11. FIG. 10 is a perspective view of the assembled push-pull hitch assembly 252. FIG. 11 is an exploded perspective view of the push-pull hitch assembly 252. As depicted in FIGS. 10-11, in one embodiment, the hitch assembly 252 includes a reel 290 and a hitch 260. The features and function of the reel 290 were described in detail in the preceding discussion regarding FIGS. 1A-9.

As shown in FIGS. 10-11, the hitch 260 includes a mounting or base plate 400, a pivot plate 402 selectively pivotally coupled to the mounting plate 400, a drawbar 280 coupled to the pivot plate 402, and a latch rod 350. A pivot pin 404, which includes a spring 406, pivotally joins the pivot plate 402 to the mounting plate 400. The pivot pin 404 allows the pivot plate 402 to displace in a generally horizontal plane relative to the mounting plate 400. In one embodiment, the holes receiving the pivot pin 404 are slightly oversized to allow the pivot plate 402 to pivot up and down as needed for the device 10 and its attached train of shopping carts to negotiate grade deviations in a travel surface along which the device 10 is towing or pushing the train of shopping carts. The spring 406 assists in biasing the pivot plate 402 into a generally parallel relationship with the mounting plate 400. In one embodiment, the spring 406 assists in biasing the pivot plate 402 into a position that is laterally centered relative to the mounting plate 400.

The mounting plate includes a plurality of mounting holes 407 for bolting the mounting plate 400 to a motorized shopping cart collection device 10. The latch rod 350 is pivotally coupled at a first end 351 to the pivot plate 402, and a second end 352 of the latch rod 350 is received in a hole 353 on the mounting plate 400 when the latch rod 350 is used to prevent pivoting between the mounting and pivot plates 400, 402. A spring 354 biases the latch rod 350 to maintain the second end 352 of the latch rod 350 in the hole 353 once the second end 352 is placed in the hole 353. To allow the pivot plate 402 to pivot relative to the mounting plate 400, the latch rod 350 is pulled upwardly to remove the second end 352 from the hole 353.

As illustrated in FIGS. 10-11, the pivot plate 402 includes a pair of yokes 408, a pair of hooks 410, a backstop 412, a pair of yoke mounts 414, and a pair of straps 416. Each yoke 408 includes a horizontally oriented slot or opening 418 configured to receive a vertical member of a shopping cart in a manner similar to that depicted in FIG. 6 with respect to hitch 50. Each yoke 408 is vertically and horizontally adjustably mounted on a yoke mount 414. In one embodiment, each yoke 414 include holes 415 on opposite sides of the opening for each slot 418 to receive a pin 419 to maintain or lock a vertical member of a shopping cart within the slot 418.

As shown in FIGS. 10-11, the straps 416 couple the drawbar 280 to the pivot plate 402. In one embodiment, the drawbar 280 is pivotally coupled to the pivot plate 402 via the straps 416. In one embodiment, the drawbar 280 is fixed such that it does not pivot relative to the pivot plate 402. In one embodiment, the drawbar 280 includes a clutch 310, which is employed as previously discussed in this specification.

As depicted in FIGS. 10-11, the hooks 408 are coupled to the pivot plate 402 and curve towards the mounting plate 400. The backstop 412 is coupled to the pivot plate 402 and includes a forward facing face 417. Thus, as can be understood from FIGS. 7A-9, a horizontal member of a shopping cart is received between the opposed surfaces of the hooks 408 and the backstop 412.

As can be understood from the preceding discussion, the hitch 260 is configured to allow the hitch 260 to couple to vertical or horizontal members of a shopping cart. Accordingly, the hitch 260 can couple to the rear or front of a shopping cart. Also, since the hitch 260 is selectively pivotal via the latch rod 350, the hitch 260 can be used to push or pull trains of shopping carts. Thus, the hitch 260 allows a motorized cart collection device 10 to perform the shopping cart push/pulling functions previously discussed with respect to FIGS. 1A-9.

In one embodiment, the hitch assembly 252 can be mounted on existing "single train" cart collection devices that were originally configured for retrieving a single train of shopping carts or a single type of shopping cart. Thus, the hitch assembly 252 serves as a conversion assembly that allows a "single train" collection device to simultaneously retrieve two trains of shopping carts (i.e., simultaneously retrieve a forward train and a rearward train), as previously discussed with respect to FIGS. 1A-6.

When retrofitted with the conversion assembly 252, the conversion assembly 252 allows a "single train" collection device to collect two dissimilar types of shopping carts with a single collection device, as previously discussed with respect to FIGS. 1A-9. Also, the conversion assembly 252 allows an existing collection device, which was originally configured to only push or only pull a train of shopping carts, to selectively push or pull a train of shopping carts as desired by the operator to meet the encountered operating conditions, as discussed with respect to FIGS. 1A-9.

In one type of conversion, it is assumed that the existing push collection device already includes a push coupler to couple a forward train to the collection device. The hitch assembly 252 is added to the collection device to convert the collection device into a push-pull collection device similar to those illustrated in FIGS. 1A-9. In another type of conversion, it is assumed that the existing pull collection device already includes a pull coupler to couple a rearward train to the collection device. The hitch assembly 252 is added to the collection device to convert the collection device into a push-pull collection device similar to those illustrated in FIGS. 1A-9. In either embodiment, the existing cart collection device is a dual direction device and has the necessary pulling/pushing power in either direction.

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A shopping cart collection device adapted to engage first and second shopping carts and capable of pulling a first train of shopping carts extending from the first shopping cart and pushing a second train of shopping carts extending from the second shopping cart, the device comprising:
   a motorized unit comprising a drive wheel;
   a first hitch proximate a first side of the motorized unit and adapted to engage the first shopping cart;
   a second hitch proximate a second side of the motorized unit opposite the first side and adapted to engage the second shopping cart; and
   a drawbar coupled to, and extending diagonally upward and away from, the first hitch,
wherein the first hitch is pivotable such that the first shopping cart is generally free to pivot in a generally horizontal plane relative to the motorized unit when the first hitch is engaged with the first shopping cart.

2. The device of claim 1, wherein the drawbar defines an opening and is adapted to receive in the opening a front end of the first shopping cart.

3. The device of claim 1, further comprising a reel coupled to the motorized unit and comprising a line extendable from the reel in the direction of the drawbar.

4. The device of claim 3, wherein the line comprises a free end including a shopping cart engagement feature.

5. The device of claim 1, further comprising a line coupled to, and extendable away from, the drawbar.

6. The device of claim 5, wherein the line comprises a free end comprising a shopping cart engagement feature.

7. The device of claim 1, wherein the second hitch is non-pivotable such that the second shopping cart is generally not free to pivot in a horizontal plane relative to the motorized unit when the second hitch is engage with the second shopping cart.

8. The device of claim 7, wherein the first hitch is adapted to engage a front end portion of the first shopping cart and the second hitch is adapted to engage a back end portion of the second shopping cart.

9. A shopping cart collection device adapted to engage first and second shopping carts and capable of pulling a first train of shopping carts extending from the first shopping cart and pushing a second train of shopping carts extending from the second shopping cart, the device comprising:
   a motorized unit comprising a drive wheel;
   a first hitch proximate a first side of the motorized unit and adapted to engage the first shopping cart; and
   a second hitch proximate a second side of the motorized unit opposite the first side and adapted to engage the second shopping cart;
wherein:
   the first hitch is pivotable such that the first shopping cart is generally free to pivot in a generally horizontal plane relative to the motorized unit when the first hitch is engaged with the first shopping cart;
   the second hitch has a pivotable mode and a non-pivotable mode and the second hitch is capable of being selectively placed in either mode;
   the second shopping cart is generally free to pivot in a generally horizontal plane relative to the motorized unit when the second hitch is engaged with the second shopping cart and in the pivotable operational mode; and
   the second shopping cart is generally not free to pivot in a horizontal plane relative to the motorized unit when the second hitch is engaged with the second shopping cart and in the non-pivotable operational mode.

10. The device of claim 9, further comprising a drawbar coupled to, and extending diagonally upward and away from, the first hitch.

11. The device of claim 10, further comprising a line coupled to, and extendable away from, the drawbar.

12. A shopping cart collection device adapted to engage a first shopping cart and pull or push a train of shopping carts extending from the first shopping cart, the device comprising:
   a motorized unit comprising a drive wheel; and
   a hitch coupled to the motorized unit and comprising first and second engagement features, wherein the first engagement feature is adapted to engage a rear end portion of the first shopping cart and the second engagement feature is adapted to engage a front end portion of the first shopping cart;
wherein:
   the hitch has a pivotable mode and a non-pivotable mode and the hitch is capable of being selectively placed in either mode;
   when the hitch is engaged with the first shopping cart and in the pivotable mode, the first shopping cart is generally free to pivot in a generally horizontal plane relative to the motorized unit; and
   when the hitch is engaged with the first shopping cart and in the non-pivotable mode, the first shopping cart is generally not free to pivot in a horizontal plane relative to the motorized unit.

13. The device of claim 12, further comprising a drawbar coupled to, and extending diagonally upward and away from, the first hitch.

14. The device of claim 13, further comprising a line coupled to, and extendable away from, the drawbar.

15. A shopping cart collection device adapted to engage a first shopping cart and pull or push a train of shopping carts extending from the first shopping cart, the device comprising:
   a motorized unit comprising a drive wheel;
   a hitch coupled to the motorized unit and comprising first and second engagement features, wherein the first engagement feature is adapted to engage a rear end portion of the first shopping cart and the second engagement feature is adapted to engage a front end portion of the first shopping cart; and
   a drawbar coupled to, and extending diagonally upward and away from, the hitch.

16. The device of claim 15, wherein the drawbar defines an opening and is adapted to receive in the opening a front end of the first shopping cart.

17. The device of claim 15, further comprising a reel coupled to the motorized unit and comprising a line extendable from the reel in the direction of the drawbar.

18. The device of claim 17, wherein the line comprises a free end including a shopping cart engagement feature.

19. The device of claim 15, further comprising a line coupled to, and extendable away from, the drawbar.

20. The device of claim 19, wherein the line comprises a free end comprising a shopping cart engagement feature.

* * * * *